US009877088B2

(12) United States Patent
Abuelsaad et al.

(10) Patent No.: US 9,877,088 B2
(45) Date of Patent: Jan. 23, 2018

(54) COOPERATIVE TASK EXECUTION IN INSTRUMENTED ROADWAY SYSTEMS

(71) Applicant: INTERNATIONAL BUSINESS MACHINES CORPORATION, Armonk, NY (US)

(72) Inventors: Tamer E. Abuelsaad, Somers, NY (US); John E. Moore, Jr., Brownsburg, IN (US); Rajeshkumar N. Singi, Marietta, GA (US); Robert R. Wentworth, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

(21) Appl. No.: 14/287,257

(22) Filed: May 27, 2014

(65) Prior Publication Data
US 2015/0350748 A1  Dec. 3, 2015

(51) Int. Cl.
H04Q 9/00 (2006.01)

(52) U.S. Cl.
CPC ........... *H04Q 9/00* (2013.01); *H04Q 2209/10* (2013.01); *H04Q 2209/40* (2013.01); *H04Q 2209/47* (2013.01); *H04Q 2209/50* (2013.01)

(58) Field of Classification Search
CPC ........... H04Q 2209/50; H04Q 2209/10; H04Q 2209/40; H04Q 2209/47; G01D 4/006;
(Continued)

(56) References Cited

U.S. PATENT DOCUMENTS 4,692,742 A * 9/1987 Raizen .................. G08B 25/10
340/524
5,347,449 A * 9/1994 Meyer .................. D01H 13/32
57/264
(Continued)

FOREIGN PATENT DOCUMENTS

EP     2201553 A1    6/2010
WO  WO 2009026161 A1  2/2009
WO  WO 2011116375 A1  9/2011

OTHER PUBLICATIONS

Linkdeke et al., "Impending Box Impact Warning System for Prevention of Snowplow-Bridge Impacts: A Final Report of Investigations." UMD Mechanical & Industrial Engineering Department, University of Minnesota Duluth, 10 University Drive Duluth MN 55812, 2009.
(Continued)

*Primary Examiner* — Hai Phan
*Assistant Examiner* — Franklin Balseca
(74) *Attorney, Agent, or Firm* — Cantor Colburn LLP; Kurt Goudy

(57) ABSTRACT

A method and system for relaying a sensor communication to a central monitoring system by utilizing a crowdsourcing model. The method includes: obtaining a registered device through crowdsourcing; registering the registered device into a central monitoring system; configuring the registered device to communicate with a plurality of road management sensors and with the central monitoring system; monitoring and gathering location information of the registered device by the central monitoring system; transmitting, via the central monitoring system, a request to gather a sensor communication from a sensor to the registered device; executing the request, via the registered device, by capturing the sensor communication emitted from the sensor, wherein the sensor communication is emitted using a passive radio-
(Continued)

frequency identification tag; and relaying at least a part of the sensor communication from the registered device to the central monitoring system.

20 Claims, 5 Drawing Sheets

(58) Field of Classification Search
CPC ....... H04W 4/02; H04W 4/021; H04W 4/025; Y02B 90/243; Y04S 20/325; H04M 3/42348; H04M 3/42357
USPC .......... 340/870.01, 870.02, 870.07; 455/11.1
See application file for complete search history.

(56) References Cited

U.S. PATENT DOCUMENTS

| | | | |
|---|---|---|---|
| 6,064,318 A * | 5/2000 | Kirchner, III | G08G 1/096716 340/905 |
| 7,002,461 B2 | 2/2006 | Duncan et al. | |
| 7,275,864 B1 | 10/2007 | Thompson | |
| 7,693,626 B2 | 4/2010 | Breed et al. | |
| 7,873,441 B2 * | 1/2011 | Synesiou | G06Q 10/00 340/870.01 |
| 7,986,218 B2 | 7/2011 | Watters et al. | |
| 8,799,036 B1 * | 8/2014 | Christensen | G07C 5/00 340/438 |
| 2001/0056484 A1 * | 12/2001 | Blumenstock | G06F 11/0748 709/224 |
| 2005/0057370 A1 * | 3/2005 | Warrior | H04B 7/18506 340/870.01 |
| 2006/0180647 A1 | 8/2006 | Hansen | |
| 2008/0119966 A1 * | 5/2008 | Breed | G07C 5/008 701/2 |
| 2008/0252483 A1 | 10/2008 | Hodges | |
| 2011/0035140 A1 | 2/2011 | Candy | |
| 2011/0260884 A1 * | 10/2011 | Yi | G07C 5/008 340/870.02 |
| 2013/0018575 A1 | 1/2013 | Birken et al. | |
| 2014/0059694 A1 * | 2/2014 | Lortz | G06F 21/60 726/26 |

OTHER PUBLICATIONS

Perkins et al. "Feasibility and Applications of RFID Technologies to Support Right-of-Way Functions:" Technical Report. No. FHWA/TX-10/0/6142-1. Texas Transportation Institute, Texas A & M University System, 2010.

Bhattacharyya, Low-Cost, Passive UHF RFID Tag Antenna-Based Sensors for Pervasive Sensing Applications. Diss. Massachusetts Institute of Technology, 2012.

Kaare et al.. "Wireless sensing in road structures using passive RFID tags." Estonian Journal of Engineering 18.4, 2012.

Arms et al. "Energy Harvesting, Wireless, Structural Health Monitoring and Reporting System", MicroStrain Inc., Dec. 2008, pp. 1-15, 2nd Asia-Pacific Workshop on SHM.

* cited by examiner

COOPERATIVE TASK EXECUTION IN INSTRUMENTED ROADWAY SYSTEMS

BACKGROUND OF THE INVENTION

1. Field of the Invention

The present invention relates to relates to cooperate task execution in instrumented roadway systems, and more specifically, to methods and a system for using a crowdsourcing model to obtain and relay information from roadway sensors.

2. Description of Related Art

Generally, road management devices and equipment are maintained by preventive maintenance schedules or when they are reported to be malfunctioning or broken. Preventative roadway maintenance is expensive and inefficient. Reactive roadway maintenance is both inefficient and time consuming.

A known method to detect road debris and potholes is using shock or bump sensors in road maintenance vehicles. The sensors require physical impact with a roadway device to determine if there is a pothole and if there is a need to report back to a central authority. For this method road maintenance vehicles patrol to collect and transmit road conditions encountered. This method is inefficient because it requires a large work crew and is costly. The present invention does not implement this technique or technology.

Often when using a vehicle to collect road information, the vehicle is outfitted with sensors that collect data using acoustic surface waves, ground penetrating radar, mm wave surface radar, or video images. The vehicle does not actually collect information from any sensors in the roadway.

In recent years roadway systems have become more intelligent by utilizing imbedded smart sensor technologies. However, there are still needs to monitor the systems more efficiently and provide accurate up-to-date communications concerning the health of road sensors. Vast roadway systems have increased the cost of connecting the road management sensors with a central monitoring command. Therefore, for current control systems and methods there is a need to become more efficient. Current methods must overcome the needs and costs related to connecting or networking the devices in order to produce a cost effective, smart sensor system that is widely distributed and able to provide near real-time communication.

Additionally, roadway systems require tremendous amounts of roadway monitoring sensors and internet connected devices in order to interact with the environment and to be part of a smarter planet. One of the challenges with current roadway monitoring sensors is that they malfunction. In order for a roadway maintenance crew to know that a sensor is malfunctioning, the roadway maintenance crew needs to either give the sensors internet connectivity or put in place frequent physical auditing requiring maintenance workers to patrol and test the sensors. Concerning both options, neither solution is realistic. To connect each sensor (or a collection of them) to the internet requires a large supported infrastructure. It also requires assignment of IP addresses, which will eventually run out. Having physical audits requires a large work crew and is expensive.

Radio-frequency identification (RFID) is the method of uniquely identifying items using radio waves. An RFID system includes at a minimum a tag, a reader, and an antenna. The reader emits a signal to the tag by way of the antenna. The antenna is usually attached to the tag. The tag responds and sends a signal to the reader. Active RFID tags require a transponder having its own power source. While active RFID tags are able to transmit great distances, the cost of providing a power source is expensive. A passive RFID tag does not require its own power source. A passive RFID tag is powered by electromagnetic energy that is transmitted from the RFID reader. Unlike active RFID tags, passive RFID tags are not able to transmit over large distances. Generally, a passive RFID tag will operate at one of three frequency ranges, low, high, and ultra high.

Near-field communication (NFC) devices are a type of RFID that operates at the high frequency range. NFC is designed to be a secure form of data exchange, which is why NFC is typically used with smartphone technology. Some NFC devices are able to read passive RFID tags.

Crowdsourcing is the practice of obtaining services, ideas, or content by soliciting contributions from a large group of people rather than company workers or suppliers. Crowdsourcing divides labor or a task among a large group of civilian volunteers and combines the efforts to produce a result. Crowdsourcing is most often used with online communities.

BRIEF SUMMARY OF THE INVENTION

The present invention provides a method for relaying a sensor communication to a central monitoring system by utilizing a crowdsourcing model, the method including: obtaining a registered device through crowdsourcing; registering the registered device into a central monitoring system; configuring the registered device to communicate with a plurality of road management sensors and with the central monitoring system; monitoring location information of the registered device by the central monitoring system; transmitting, via the central monitoring system, a request to gather a sensor communication from a sensor to the registered device; executing the request, via the registered device, by capturing the sensor communication emitted from the sensor, wherein the sensor communication is emitted using a passive radio-frequency identification tag; and relaying at least a part of the sensor communication from the registered device to the central monitoring system.

The present invention also provides a method for relaying a sensor communication to a central monitoring system by utilizing a crowdsourcing model, the method including: obtaining a registered device through crowdsourcing; enrolling the registered device into a message carrier system; configuring the registered device to communicate with a plurality of road management sensors and with a central monitoring system; entering the proximity of a sensor with the registered device; detecting a sensor communication emitted by a passive radio-frequency identification tag via the registered device which pertains to a state of operation of the sensor; capturing the sensor communication, a geo-location, and a timestamp emitted from the sensor using a passive-frequency identification reader; examining the sensor communication, the geo-location, and the timestamp to determine a intended destination in the central monitoring system for the sensor communication; and relaying the sensor communication, the geo-location, and the timestamp to the intended destination in the central monitoring system.

Further, the present invention provides a system for relaying a sensor communication to a central monitoring system by utilizing a crowdsourcing model, the system including: a memory; a processor communicatively coupled to the memory; and a module communicatively coupled to the memory and the processor, wherein the module is configured to perform the steps of a method including: obtaining a registered device through crowdsourcing; configuring the registered device to communicate with a plurality of road management sensors and with the central monitoring system; capturing the sensor communication emitted from the sensor, wherein the sensor communication is emitted using a passive radio-frequency identification tag; and relaying at least a part of the sensor communication from the registered device to the central monitoring system.

DETAILED DESCRIPTION OF THE PREFERRED EMBODIMENTS

Figure 1:
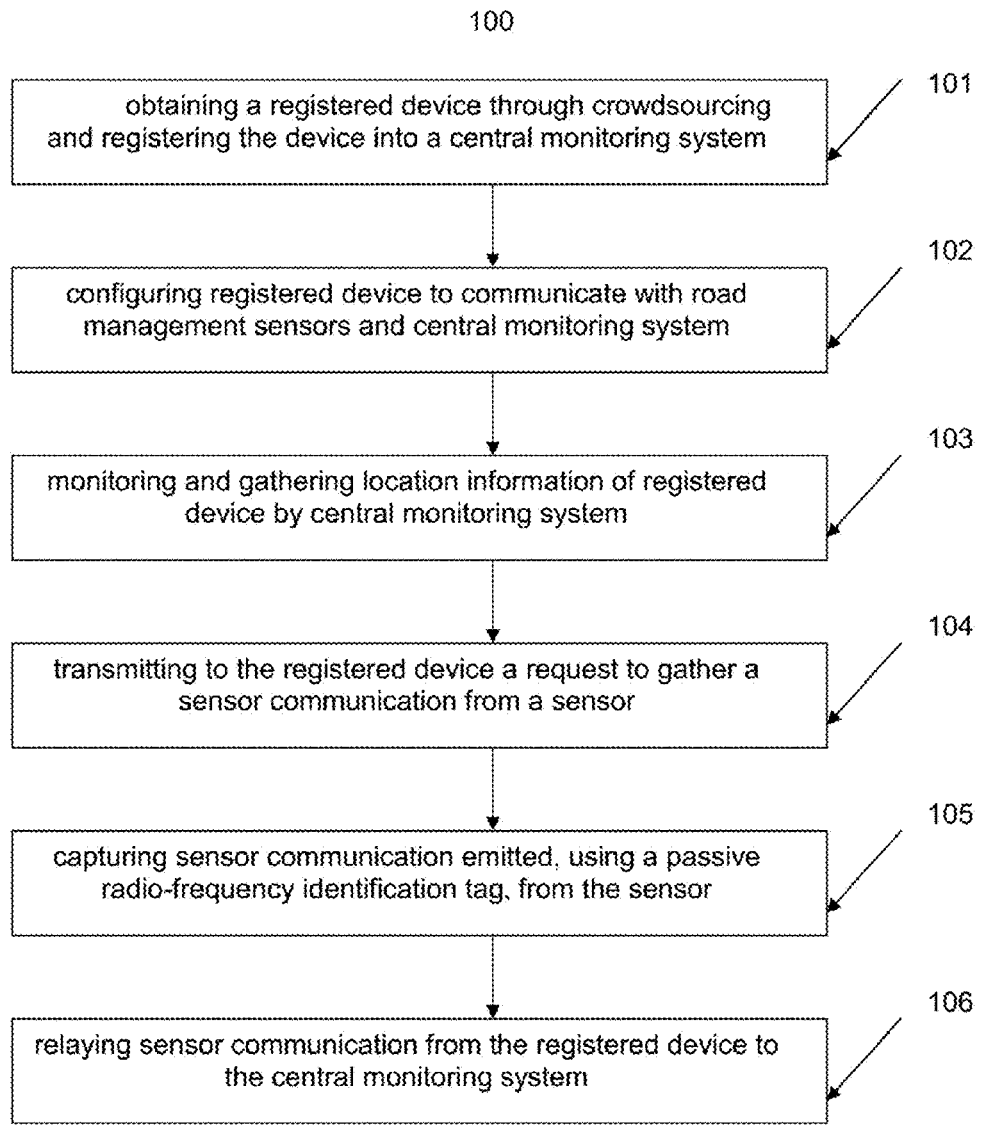
FIG. 1 is a flowchart depicting a method for relaying a sensor communication to a central monitoring system by utilizing a crowdsourcing model according to embodiments of the present invention.

The maintenance of road/transportation management devices and equipment on the huge network of roadways is a very challenging and time consuming task. Therefore, the present invention uses a crowdsourcing model in which civilian owned registered devices are equipped with a system that gathers information of requested roadway devices and equipment. As a registered device enters the proximity of a roadway sensor, the registered device receives a sensor communication emitted from the sensor. The registered device then relays the sensor communication to a central monitoring system/station. The present invention provides a cost effective, efficient system for gathering maintenance information from road/transportation management devices and equipment.

In the present invention, the status of road/transportation management devices and equipment are monitored using a crowdsourcing model to provide timely and accurate status information relating to maintenance needs. It is an objective of the present invention to reduce both the time and cost of road management devices and repairs.

Using a crowdsourcing model it is possible to monitor and report back to a central monitoring system the health of roadside devices. In the present invention, by utilizing internet connected devices, such as vehicles and smartphones, which come in contact or within proximity of road management sensors, it is possible to collect information on the state of operation of roadways and then relay the information to a central monitoring system in a timely manner.

Sensors communicate to nearby internet connected devices with a form of passive radio-frequency identification (RFID), such as near-field communication (NFC), and send a message that is tied to that specific sensor. The devices then relay the messages to a central monitoring system by utilizing a mobile relay point.

It is known art that passive RFID does not require constant power, but that it receives power by a receiver when it comes within proximity to the passive RFID tag. By deploying road services sensors using passive RFID tags, the registered devices equipped with the receiving sensor (reader) can power the tags briefly as it goes by, allowing for the health check to occur and transmit its status which might be stored in an EPROM of some sort.

An increasing number of vehicles are equipped with GPS systems, onboard computers, and other sensors and communication devices. Therefore, a vehicle owner can volunteer to participate in gathering status/maintenance information for transportation management devices within the vehicle's vicinity or typical driving route. Participation can be based on an incentive plan such as a point system based on the tier of information gathered.

In the present invention a civilian volunteer (obtained by crowdsourcing) completes a mission for a central roadway monitoring system. The central roadway monitoring system can instruct the civilian via a registered device to check a sensor at location X by communicating with it using a protocol (e.g. Bluetooth, RFID, NFC, etc). The civilian, via the registered device, executes the command received from central roadway system, captures any results, and reports back to the central roadway monitoring system.

A central monitoring system gathers the location information of an enrolled registered device, for example a vehicle, based on the location of the registered device. The central monitoring system identifies a list of nearby roadway sensors for the vehicle to monitor. In embodiments of the present invention, the central monitoring system can use "typical" route of the vehicle, from work to home or the current location of the vehicle to home, based on driving patterns to queue requests for gathering information from sensors concerning the heath of the roadway, the location of the sensor, the types of communication, and the response types. These requests can be transmitted to the vehicle using satellite, Wi-Fi, a cellular network, or similar means.

For the request, the registered device, for example a vehicle, broadcasts the message based on the vehicle's location and closest roadway sensor locations. The registered device listens for the response from a sensor. Once, the response is received and verified by the registered device, it is transmitted back to the central monitoring system in real-time or when connectivity is available for transmitting the response back. The sensor communication between the registered device and the sensor could be by any close proximity communication method such as but not limited to passive RFID, including NFC, or Bluetooth.

Roadway sensors and systems are put in place to serve the general public. Generally civilians possess vehicles, smartphones, and smart devices that are internet connected. The present invention allows these personally owned, internet connected devices such as automobiles and smartphones to carry messages or sensor communications that are being emitted by the disparate sensors. The devices then deliver the messages to the intended destination by allowing the mobile device to become a remote mobile relay system.

For example, according to embodiments of the present invention, a civilian registers their vehicle to become a registered device. The vehicle drives over a roadway sensor equipped with NFC (it is less costly to have NFC than some Internet protocol infrastructure in each sensor) that communicates to the vehicle that is has detected a malfunction. The vehicle relays that message and coordinates (and/or sensor identification) to a mobile relay point which forwards the message to the intended central monitoring system.

For example, according to another embodiment of the present invention, John is driving his car on roadway I-84. I-84 pollution sensor at mile marker 15.2 is malfunctioning. The sensor emits an S.O.S sensor communication message. John had enrolled his car (the registered device) to be part of the message carrier system or Roadway Message Carrier Agents. As John drives past the sensor, his car captures the S.O.S message (sensor communication) using a passive RFID reader and notes the geo-location (coordinates; longitude, latitude) and timestamp. An application running in John's car examines the sensor communication envelop to determine the proper intended destination of sensor communication. John's car then relays the sensor communication, timestamp, and geo-location to the intended destination in the central monitoring system.

According to embodiments of the present invention, a sensor communication does not need to have an intended destination. It could be that John's car, from the above example, simply sends the communication to a central monitoring system configured in the roadway system application in his car. The roadway system application can determine the intended destination based on the message parameters. Communication between internet connected registered device and the disparate system can utilize any communication protocol necessary. In some cases NFC is sufficient, but other communication protocols that allow for a longer communication distance can be used.

Advantages of the present invention include reduced costs and time to identify roadway defects and dispatch a repair crew, without expensive city workers driving around or expensive independent communication networks connecting the devices to the central monitoring system. Another benefit is that the present invention exploits internet connected devices to relay a sensor communication to a roadway central monitoring system, thus reducing the overhead related to having a vast network of interconnected sensors and computers. Additionally, a civilian can be credited for enrolling in the system and delivering sensor communications since this is an opt-in system (crowdsourcing model) and can offer incentives to participants.

Aspects of the present invention will now be described below with reference to flowchart illustrations and/or block diagrams of methods and systems according to embodiments of the present invention. The flowchart, diagrams, and block diagrams in the figures illustrate the architecture, functionality, and operation of possible implementations of systems and methods according to various embodiments of the present invention. In this regard, each block in the flowchart, diagrams, or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the diagrams, block diagrams, and/or flowchart illustrations, and combinations of blocks in the diagrams, block diagrams, and/or flowchart illustrations can be implemented by special purpose systems that perform the specified functions or acts, or combinations of special purpose hardware and computer instructions.

In FIG. 1 a flowchart 100 depicts a method for relaying a sensor communication to a central monitoring system by utilizing a crowdsourcing model according to embodiments of the present invention. In step 101 a registered device is obtained through crowdsourcing. The registered device can be a vehicle, a smartphone, or tablet according to embodiments of the present invention. The registered device is registered into a central monitoring system.

In step 102 the registered device is configured to communicate with road management sensors and the central monitoring system. In step 103 the central monitoring system monitors the location of the registered device. The central monitoring system then gathers the registered device's location information and based on the location of the registered device, the central monitoring system creates the list of nearby sensors or sensors located on route of the registered device to be tracked. In step 104 the central monitoring system transmits to the registered device a request to gather a sensor communication from a sensor on the list created in step 103. The registered device receives the requests and acknowledges receipt.

In step 105 the registered device's reader emits a signal, by way of RFID, to the passive RFID tag in a sensor by way of the antenna. The registered device listens for the sensor communication response based on the distance of the sensor from the device. Once in range of the passive RFID tag in the sensor, the sensor responds to the request and emits a sensor communication (signal) to the RFID reader. In the present invention, sensor communications can be sent or received using allowed communication protocol listed in the request.

In step 106 the registered device processes the sensor communication and relays it to the central monitoring system. According to embodiments of the present invention, upon receipt of the sensor communication the civilian who operates the registered device is given credit for processing the request.

Figure 2:
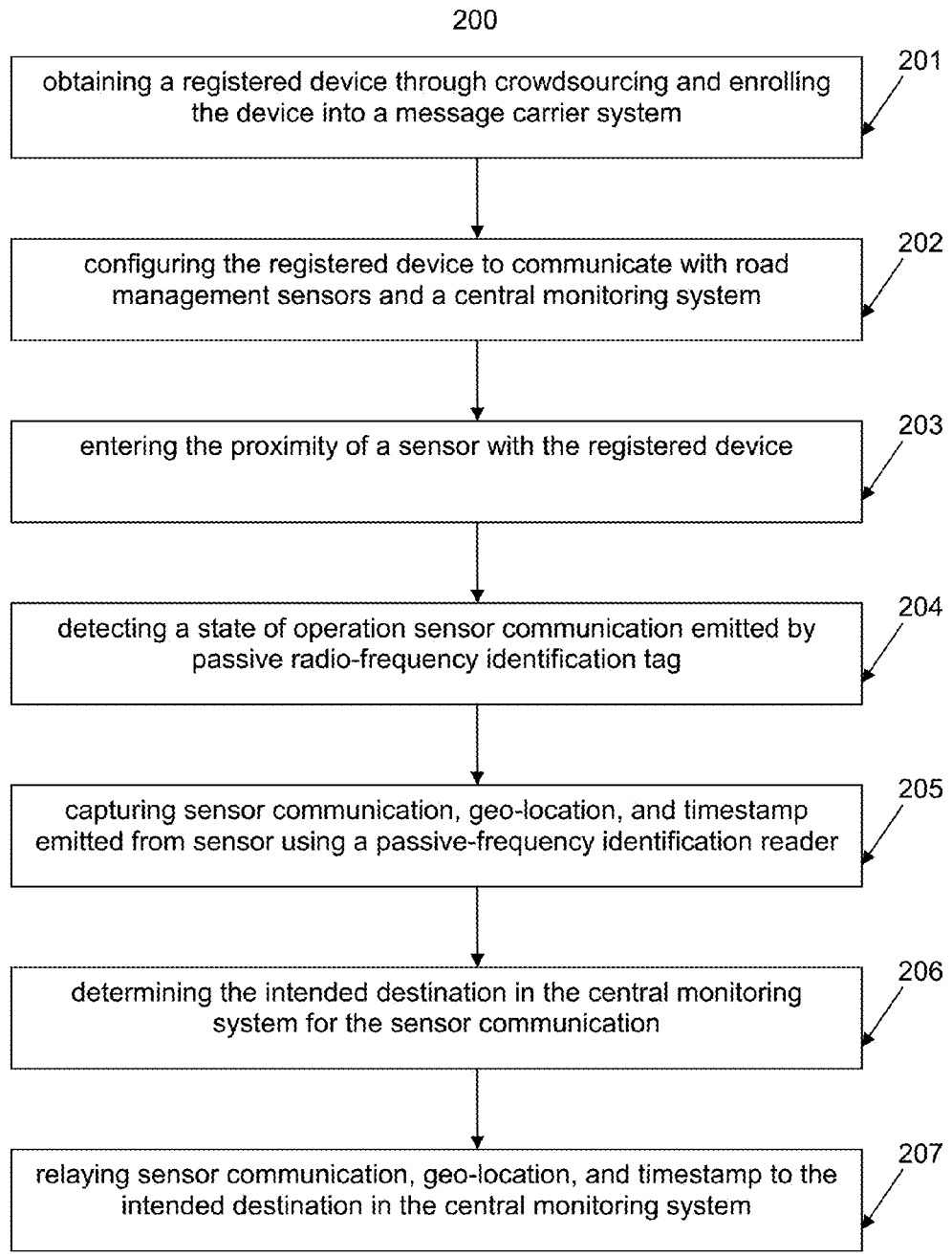
FIG. 2 is a flowchart depicting a method for relaying a sensor communication to a central monitoring system by utilizing a crowdsourcing model according to embodiments of the present invention.

In FIG. 2 a flowchart 200 illustrates a method for relaying a sensor communication to a central monitoring system by utilizing a crowdsourcing model according to embodiments of the present invention. In step 201 a registered device is obtained through crowdsourcing. In this step the owner of an internet connected device (a registered device) volunteers/opts-in to be part of a message carrier system. The registered device is then enrolled into the message carrier system.

The registered device is configured to communicate with road management sensors and a central monitoring system in step 202. This configuration can be set up using a simple application or a more complex feature. Generally an RFID reader or NFC is used. Once the configuration is complete the registered device is ready to listen for sensor communications and report them back to the central monitoring system/central command/control system).

In step 203 the registered device enters the proximity of a sensor. In step 204 the registered device detects a state of operation sensor communication emitted by a passive RFID tag located in the roadway sensor. According to embodiments of the present invention, detection can be done via any desired protocol supported by device and sensor. The registered device captures the sensor communication in step 205. In embodiments of the present invention a geo-location and timestamp emitted from the sensor are also captured in step 205.

In step 206 the registered device determines the intended destination in the central monitoring system for the sensor communication. Moreover, an application or the equivalent installed on a registered device can examine the sensor communication to determine an intended destination. Alternatively, the sensor communication might not require the device to examine intended destination and destination selection can be obtained by message attributes, such as message type. Once the intended destination is determined, the registered device relays the sensor communication to the intended destination or recipient in the central monitoring system. In embodiments of the present invention the registered device relays the geo-location and timestamp along with the sensor communication.

Figure 3:
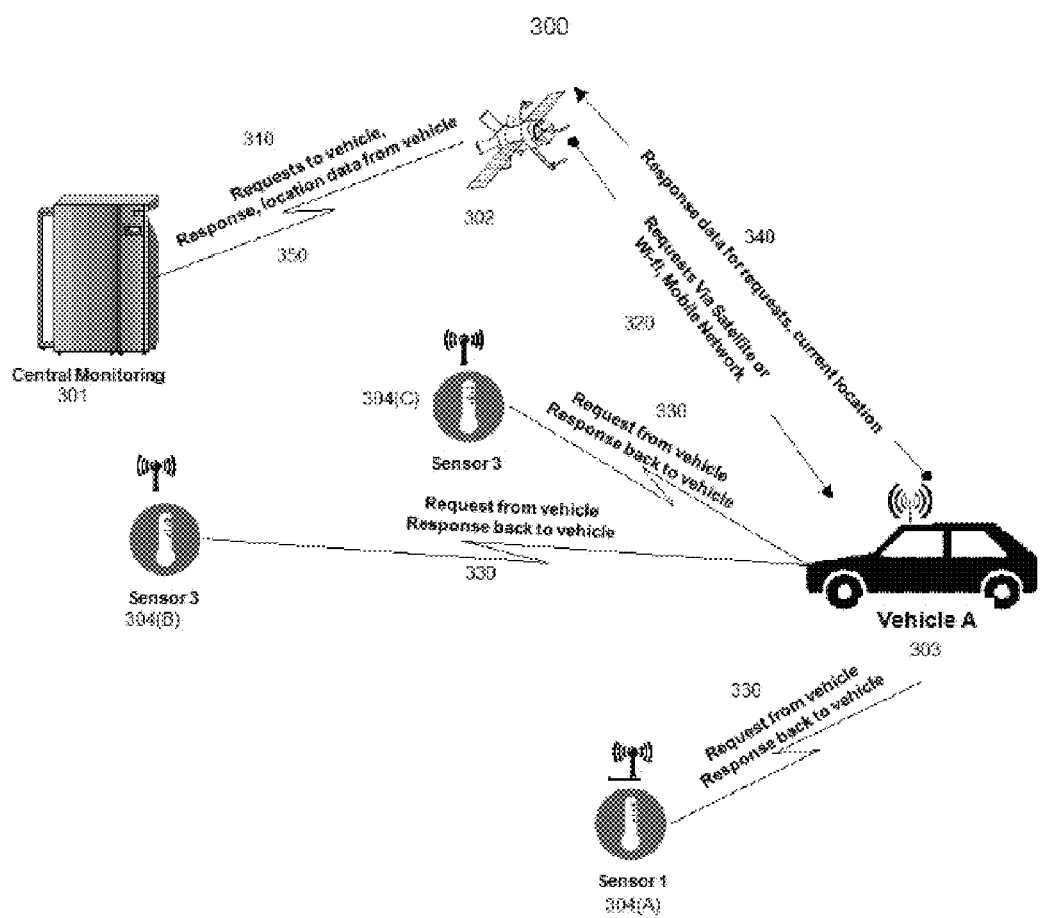
FIG. 3 is a diagram schematically illustrating a method and system in which a central monitoring system sends a request to a vehicle that gathers a sensor communication from a sensor and relays it back to the central monitoring system according to embodiments of the present invention.

FIG. 3 includes a diagram 300 schematically illustrating a method and system in which a central monitoring system sends a request to a registered device that gathers a sensor communication from a sensor and relays it to the central monitoring system according to embodiments of the present invention. Central monitoring system (central monitoring) 301 gathers information. Based on the location information that central monitoring 301 receives, a request 310 is sent to a specific mobile relay point (monitoring station) 302. Monitoring station 302 transmits the request 320 to a registered device. According to embodiments of the present invention a vehicle 303 is the registered device. The request 320 can be sent via satellite, Wi-Fi, or mobile network. Vehicle 303 receives the request 320 and acknowledges receipt.

Vehicle 303 broadcasts the request 320 to a specific sensor 304(A) and listens for the sensor communication (response) 330 based on the distance of the vehicle 303 to the sensor 304(A). In embodiments of the present invention a different specific sensor 304(B) or 304(C) receives a request 320 for a sensor communication and provides a response 330. Requests can be sent or received using allowed communication protocol listed in the request 320. According to embodiments of the present invention the request 320 is received and sent by a passive RFID reader and tag. According to another embodiment of the present invention NFC is used to receive the request 320 and provide a response 330 back to vehicle 303.

Next, vehicle 303 processes response 330 from sensor 304(A). Vehicle 303 transmits response 340 back to the monitoring station 302 where it is forwarded 350 to central monitoring 301 along with location data from vehicle 303. Upon response receipt, a civilian who operates vehicle 303 can be credited for relaying response 340 back to the monitoring station 302.

Figure 4:
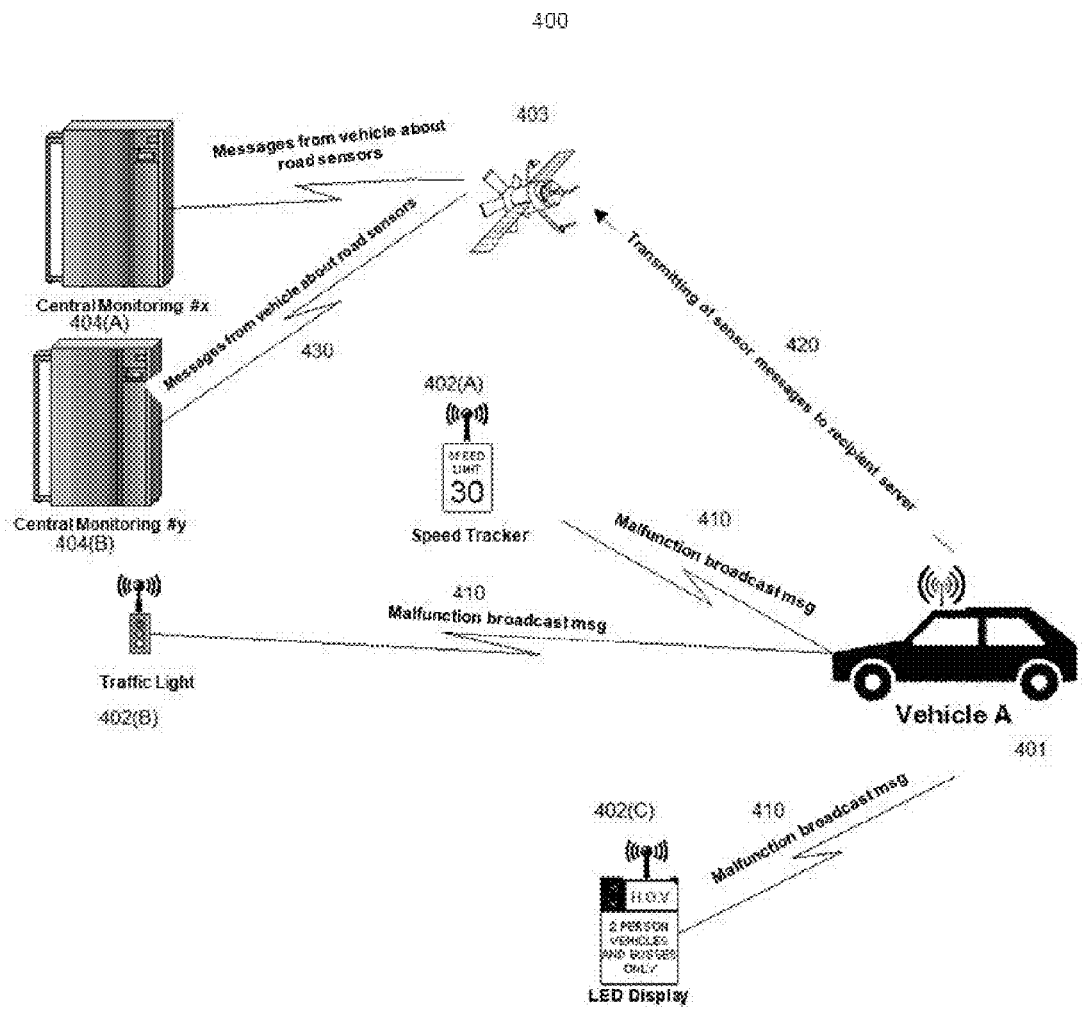
FIG. 4 is a diagram schematically illustrating a method and system in which a vehicle receives sensor communications emitted by sensors and transmits them to a central monitoring system according to embodiments of the present invention.

In FIG. 4 a diagram 400 schematically illustrates a method and system in which a vehicle receives sensor communications emitted by sensors and transmits them to a central monitoring system according to embodiments of the present invention. Registered device (vehicle) 401 listens for sensor communications (malfunction broadcast messages) 410 emitted by nearby roadway sensors. When a malfunction broadcast message 410 is detected vehicle 401 examines the message 410 for its intended destination directly, or derives the intended destination based on the malfunction broadcast message 410 attributes. According to embodiments of the present invention, roadway sensors can include a speed tracker 402(A), a traffic light 402(B), or an LED roadway display 402(C).

When vehicle 401 detects a malfunction broadcast message 410 it records key information from the malfunction broadcast message 410 including a geo-location and timestamp. Vehicle 401 transmits 420 the malfunction broadcast message 410 to its indicated mobile relay point (recipient server) 403. Transmission 420 of the malfunction broadcast message 410 can be by satellite communication, Wi-Fi, or any other communication channel for relaying messages.

The intended recipient server 403 gathers the malfunction broadcast message 410 and analyzes the messages to determine the proper centralized monitoring station 404(A) or 404(B) for the message. The malfunction broadcast message 410 is then sent to the proper centralized monitoring station 404(A) or 404(B).

Figure 5:
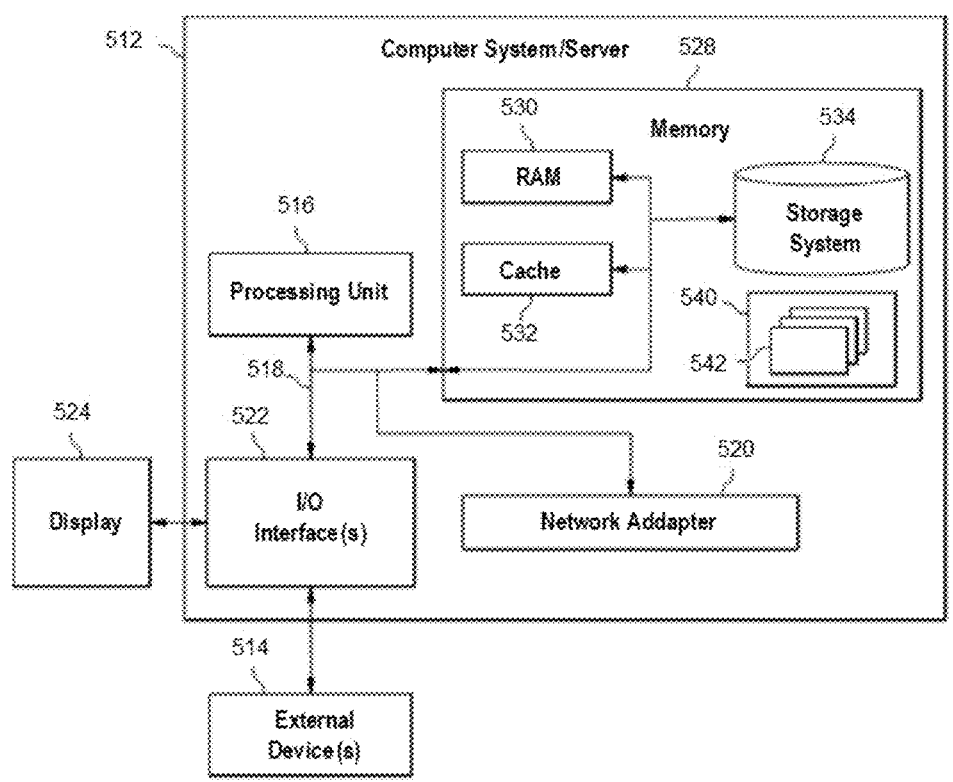
FIG. 5 is a block diagram of an exemplary computer system/server which is applicable to implement embodiments of the present invention.

FIG. 5 is a block diagram of an exemplary computer system/server which is applicable to implement embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 5 shows a block diagram of an exemplary computer system/server 512 which is applicable to implement the embodiments of the present invention. The computer system/server 512 shown in FIG. 5 is only illustrative and is not intended to suggest any limitation as to the scope of use or functionality of embodiments of the invention described herein.

As shown in FIG. 5, computer system/server 512 is shown in the form of a general-purpose computing device. The components of computer system/server 512 can include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media can be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 can further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 can include at least one program product having a set (e.g., at least one) of program modules that are configured to carry out the functions of embodiments of the invention.

Program/utility 540, having a set (at least one) of program modules 542, can be stored in memory 528, by way of example, and not limitation, as well as an operating system, one or more application programs, other program modules, and program data. Each of the operating system, one or more application programs, other program modules, and program data or some combination thereof, can include an implementation of a networking environment. Program modules 542 generally carry out the functions and/or methodologies of embodiments of the invention as described herein.

Computer system/server 512 can also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components can be used in conjunction with computer system/server 512. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for relaying a sensor communication to a central monitoring system by utilizing a crowdsourcing model, the method comprising:

obtaining a registered device through crowdsourcing;

registering the registered device into a central monitoring system;

configuring the registered device to communicate with a plurality of road management sensors and with the central monitoring system;

monitoring location information of the registered device by the central monitoring system;

transmitting, via the central monitoring system, a request to gather a sensor communication from a sensor to the registered device;

executing the request, via the registered device, by capturing the sensor communication emitted from the sensor, wherein the sensor communication is emitted using a passive radio-frequency identification tag;

examining, by the registered device, the sensor communication to identify a relay point, different than the central monitoring system, to which the sensor communication is to be transmitted; and relaying, by the registered device, to the relay point, the sensor communication and a location of the sensor, wherein the relay point determines a first central monitoring system to which the sensor communication is to be forwarded in response to the sensor communication being indicative of a malfunction at the sensor, the relay point determines a second central monitoring system to which the sensor communication is to be forwarded in response to the sensor communication not being indicative of the malfunction at the sensor, and wherein the determination of a destination central monitoring system for the sensor communication is further based on attributes of the sensor communication, a timestamp at which the sensor communication is captured, and the location of the sensor initiating the sensor communication so that the destination central monitoring system communicates with a corresponding repair crew to be dispatched to the sensor in case of malfunction.

2. The method according to claim 1, wherein the passive radio frequency identification tag comprises a near-field communication tag.

3. The method according to claim 1, wherein the registered device comprises a vehicle capable of using wireless techniques.

4. The method according to claim 1, wherein the registered device comprises a mobile device capable of using wireless techniques.

5. The method according to claim 1, wherein the sensor communication comprises at least one of: location information, sensor status information, sensor communication timestamp information, and sensor communication destination information.

6. The method according to claim 1, wherein the request to gather the sensor communication from the sensor is based on the location information of the registered device monitored by the central monitoring system.

7. The method according to claim 1, wherein the request to gather the sensor communication from the sensor is based on route patterns of the registered device obtained by monitoring the location information of the registered device by the central monitoring system.

8. The method of claim 1, further comprising: crediting a civilian who operates the registered device for relaying the sensor communication to the central monitoring system.

9. The method of claim 1, wherein the location of the sensor is transmitted by the registered device based on a location of the registered device.

10. A method for relaying a sensor communication to a central monitoring system by utilizing a crowdsourcing model, the method comprising:
 obtaining a registered device through crowdsourcing;
 enrolling the registered device into a message carrier system;
 configuring the registered device to communicate with a plurality of road management sensors and with a central monitoring system;
 entering a predetermined proximity of a sensor with the registered device;
 detecting a sensor communication emitted by a passive radio-frequency identification tag via the registered device, wherein the sensor communication pertains to a state of operation of the sensor;
 capturing, by the registered device, the sensor communication, a geo-location, and a timestamp emitted from the sensor using a passive-frequency identification reader, and transmitting, by the registered device, the sensor communication for receipt by a relay point, different than the central monitoring system;
 examining, by the relay point, the sensor communication, the geo-location, and the timestamp to determine a monitoring station in the central monitoring system for the sensor communication, wherein the relay point determines a first monitoring station from the central monitoring system to which the sensor communication is to be forwarded in response to the sensor communication being indicative of a malfunction at the sensor, and the relay point determines a second monitoring station from the central monitoring system to which the sensor communication is to be forwarded in response to the sensor communication not being indicative of the malfunction at the sensor; and
 relaying the sensor communication, the geo-location, and the timestamp to one of the first monitoring station or the second monitoring station in the central monitoring system, which communicates with a corresponding repair crew to be dispatched to the sensor in case of malfunction.

11. The method according to claim 10, wherein the passive radio-frequency identification tag and passive-frequency identification reader tag comprise near-field communication devices.

12. The method according to claim 10, wherein the registered device comprises a vehicle capable of using wireless techniques having a roadway system application.

13. The method according to claim 12, wherein the vehicle does not examine the geo-location and timestamp, and wherein the roadway system application determines the monitoring station in the central monitoring system for the sensor communication based on attributes of the sensor communication.

14. The method according to claim 10, wherein the registered device comprises a mobile device capable of using wireless techniques.

15. The method according to claim 10, further comprising crediting the registered device in response to the central monitoring station receiving at least a part of the sensor communication response.

16. A system for relaying a sensor communication to a central monitoring system by utilizing a crowdsourcing model, the system comprising:
 a memory;
 a processor communicatively coupled to the memory; and
 a module communicatively coupled to the memory and the processor, wherein the module is configured to perform the steps of a method comprising:
 receiving a transmission of the sensor communication from a registered device, the sensor communication emitted from a roadway sensor, wherein the sensor communication is emitted using a passive radio-frequency identification tag;
 determining a first central monitoring station to which at least a part of the sensor communication is to be forwarded in response to the sensor communication being indicative of a malfunction at the sensor, and determining a second central monitoring station to which the at least a part of the sensor communication is to be forwarded in response to the sensor communication not being indicative of the malfunction at the sensor, and, wherein the determination is further based on attributes of the sensor communication, and a location of the roadway sensor, and wherein the determination of a destination central monitoring system for the sensor communication is further based on a timestamp at which the sensor communication is captured, and the location of the roadway sensor initiating the sensor communication; and
 relaying the at least a part of the sensor communication from the registered device to one of the first central monitoring station or the second central monitoring station of the central monitoring system, which communicates with a corresponding repair crew to be dispatched to the sensor in case of malfunction.

17. The system according to claim 16, wherein the passive radio frequency identification tag comprises a near-field communication tag.

18. The system according to claim 16, further comprising the steps of:
 monitoring and gathering location information of the registered device by the central monitoring system;
 transmitting, via the central monitoring system, to the registered device a request to gather a sensor communication from a sensor; and
 executing the request, via the registered device, by capturing the sensor communication emitted from the sensor.

19. The system according to claim 16, further comprising the steps of:
 capturing, by the registered device, a geo-location and a timestamp emitted from the roadway sensor using a passive-frequency identification reader; and
 examining the sensor communication, the geo-location, and the timestamp to determine the monitoring station in the central monitoring system for the sensor communication.

20. The system according to claim 16, further comprising:
 crediting the registered device for transmitting the sensor communication.

* * * * *